United States Patent
Hunter et al.

(10) Patent No.: US 11,650,004 B1
(45) Date of Patent: May 16, 2023

(54) CONNECTOR ASSEMBLY FOR VACUUM INSULATED STRUCTURES

(71) Applicant: WHIRLPOOL CORPORATION, Benton Harbor, MI (US)

(72) Inventors: Lynne F. Hunter, Dorr, MI (US); Aaron M. Stewart, Buchanan, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/528,634

(22) Filed: Nov. 17, 2021

(51) Int. Cl.
*B65G 65/32* (2006.01)
*F25D 23/06* (2006.01)

(52) U.S. Cl.
CPC ......... *F25D 23/062* (2013.01); *F25D 23/066* (2013.01); *B65G 65/32* (2013.01); *F25D 2201/122* (2013.01); *F25D 2201/14* (2013.01); *F25D 2400/04* (2013.01)

(58) Field of Classification Search
None
See application file for complete search history.

(56) References Cited

U.S. PATENT DOCUMENTS

| 2,164,143 | A | 6/1939 | Munters |
| 2,620,957 | A | 12/1952 | Taylor |
| 5,803,140 | A | 9/1998 | Jodoin |
| 8,430,138 | B2 | 4/2013 | McGeary |
| 11,052,579 | B2 | 7/2021 | Deka et al. |
| 2017/0157809 | A1 | 6/2017 | Deka et al. |
| 2017/0160001 | A1 | 6/2017 | Deka et al. |
| 2020/0240572 | A1 | 7/2020 | Naik et al. |

FOREIGN PATENT DOCUMENTS

WO 2020050838 A1 3/2020

*Primary Examiner* — Alexander S Thomas
(74) *Attorney, Agent, or Firm* — Price Heneveld LLP

(57) ABSTRACT

A connector assembly includes a base plate that defines a fill opening and an aperture. A fill tube is coupled to a first side of the base plate. The fill tube is aligned with the fill opening. A radial flange is coupled to a second side of the base plate. The radial flange extends around the fill opening. A toggle magnet is coupled to the first side of the base plate proximate to the aperture. The toggle magnet is operable between an activated state and a deactivated state.

15 Claims, 13 Drawing Sheets

US 11,650,004 B1

CONNECTOR ASSEMBLY FOR VACUUM INSULATED STRUCTURES

BACKGROUND OF THE DISCLOSURE

The present disclosure generally relates to a connector assembly, and more specifically, to a connector assembly for vacuum insulated structures.

SUMMARY OF THE DISCLOSURE

According to one aspect of the present disclosure, a fill system for a vacuum insulated structure includes a door having a structural wrapper that defines an insulating cavity. The structural wrapper defines a fill port that is in fluid communication with the insulating cavity for receiving insulation materials therein. The door defines at least one projection extending from proximate to the fill port. A connector assembly is selectively coupled to the door for coupling the door with a materials dispenser. The connector assembly includes a base plate configured to be disposed adjacent to the structural wrapper. The base plate defines at least one aperture configured to receive the at least one projection. A fill tube extends from the base plate and is configured to align with the fill port. A toggle magnet is coupled to the base plate. The toggle magnet is operable between an activated state and a deactivated state. The toggle magnet is configured to magnetically engage the door when in the activated state.

According to another aspect of the present disclosure, an appliance door includes a structural wrapper that defines an insulating cavity. The structural wrapper defines a fill port for receiving insulation material and the fill port is in fluid communication with the insulating cavity. A connector assembly is configured to selectively couple the structural wrapper with a materials dispenser. The connector assembly includes a base plate configured to be disposed adjacent to an outer surface of the structural wrapper. A toggle magnet is coupled to the base plate. The toggle magnet is configured to selectively couple the connector assembly to the structural wrapper when activated. A fill tube extends from the base plate and is configured to extend away from the structural wrapper when the connector assembly is coupled to the structural wrapper. The fill tube is configured to engage the materials dispenser.

According to yet another aspect of the present disclosure, a connector assembly includes a base plate that defines a fill opening and an aperture. A fill tube is coupled to a first side of the base plate. The fill tube is aligned with the fill opening. A radial flange is coupled to a second side of the base plate. The radial flange extends around the fill opening. A toggle magnet is coupled to the first side of the base plate proximate to the aperture. The toggle magnet is operable between an activated state and a deactivated state.

These and other features, advantages, and objects of the present disclosure will be further understood and appreciated by those skilled in the art by reference to the following specification, claims, and appended drawings.

Figure 1:
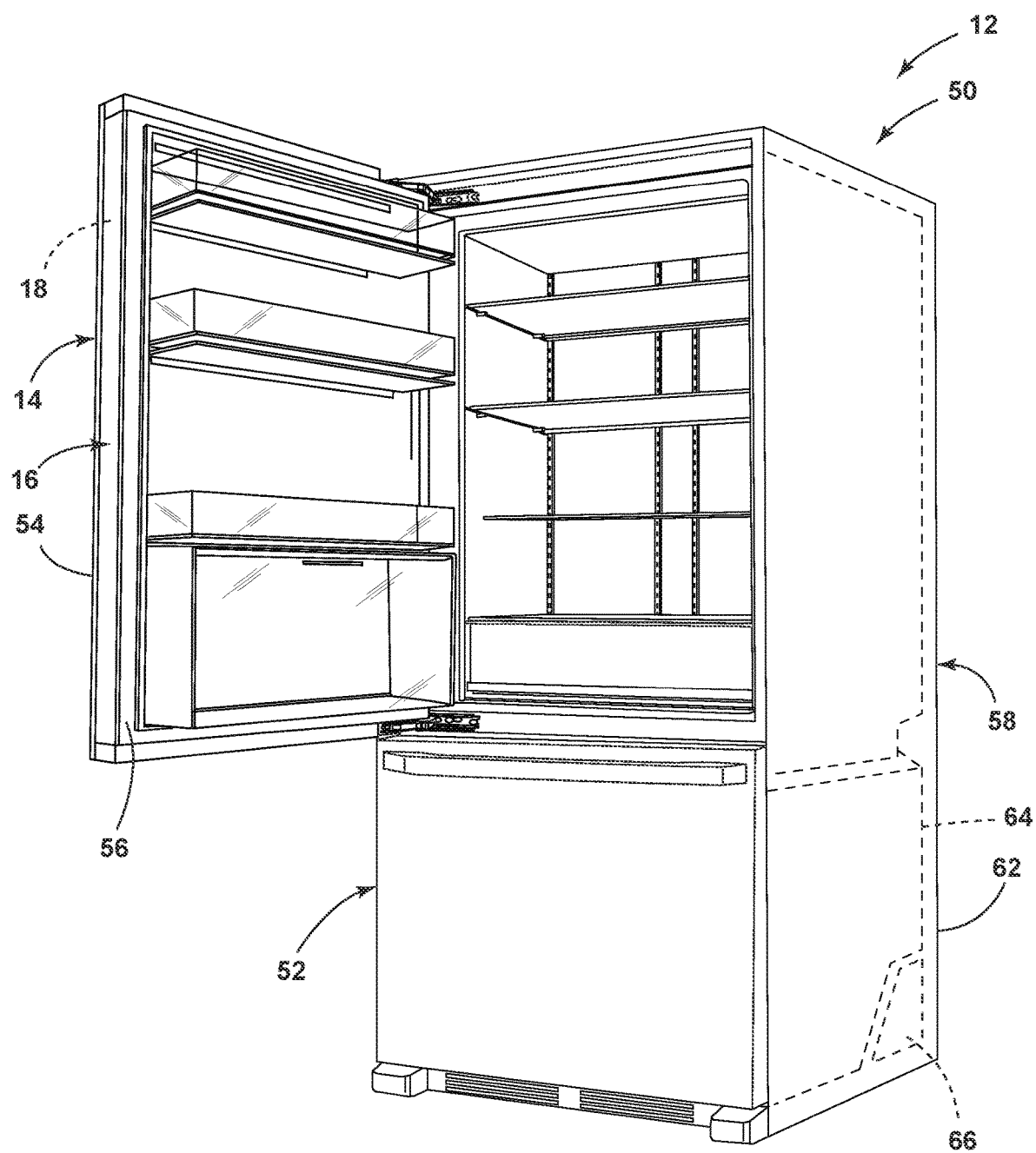
FIG. 1 is a front perspective view of a refrigerator having an insulated cabinet and insulated doors, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a connector assembly for vacuum insulated structures. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

With reference to FIGS. 1-13, reference numeral 10 generally designates a fill system for a vacuum insulated structure 12 that includes a door 14 having a structural wrapper 16 defining an insulating cavity 18. The structural wrapper 16 defines a fill port 20 in fluid communication with the insulating cavity 18 for receiving insulation materials 22 therein. The door 14 defines at least one projection 24 extending from proximate to the fill port 20. A connector assembly 26 is selectively coupled to the door 14 for coupling the door 14 with a materials dispenser 28. The connector assembly 26 includes a base plate 30 configured to abut the structural wrapper 16. The base plate 30 defines at least one aperture 32 configured to receive the at least one projection 24. The connector assembly 26 also includes a fill tube 34 that extends from the base plate 30 and is configured to align with the fill port 20 and a toggle magnet 36 coupled to the base plate 30. The toggle magnet 36 is operable between an activated state and a deactivated state. The toggle magnet 36 is configured to magnetically engage the door 14 when in the activated state.

Figure 2:
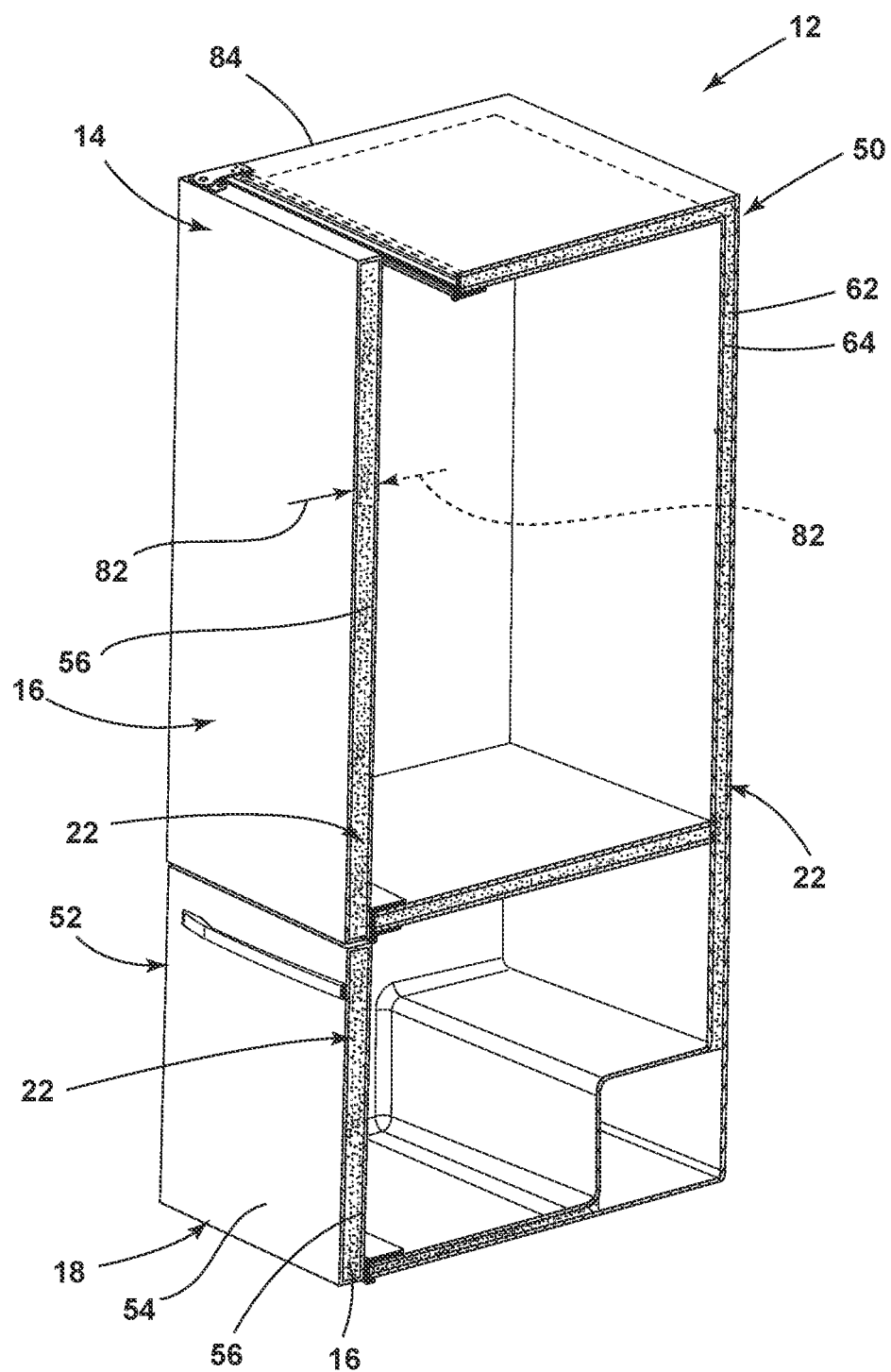
FIG. 2 is a cross-sectional front perspective view of a refrigerator having an insulated cabinet and insulated doors, according to the present disclosure.

Referring to FIGS. 1 and 2, the vacuum insulated structure 12 is generally illustrated as the door 14 for an appliance 50, such as the illustrated refrigerating appliance 50; however, it is contemplated that the door 14 disclosed herein may be used with a variety of appliances 50, structures, or insulation purposes other than with the appliance 50. Moreover, the illustrated refrigerating appliance 50 is a bottom mount refrigerator having the door 14 and a second door 52, which can have a substantially similar configuration as the door 14 as discussed further herein. The doors 14 may be rotationally and/or laterally operable panels for doors 14 and drawers. In non-limiting examples, the refrigerating appliance 50 can be a bottom mount refrigerator, a bottom mount French-door refrigerator, a top mount refrigerator, a side-by-side refrigerator, a four-door French-door refrigerator, and/or a five-door French door refrigerator, each of which can have one or more doors 14.

As illustrated in FIGS. 1 and 2, the appliance 50 may include multiple vacuum insulated structures 12. One of the vacuum insulated structures 12 is the door 14, which includes the structural wrapper 16 defining the insulating cavity 18 therebetween. The structural wrapper 16 may include an outer wrapper 54 coupled with an inner liner 56, which define the insulating cavity 18 therebetween. A cabinet 58 of the appliance 50 is also an example of the vacuum insulated structures 12. The cabinet 58 includes a cabinet wrapper 62 and a cabinet liner 64 with an insulation cavity 66 defined therebetween.

Each of the insulating cavity 18 of the door 14 and the insulation cavity 66 of the cabinet 58 typically includes one or more insulation materials 22 disposed therein. It is generally contemplated that the insulation materials 22 may be glass-type materials, carbon-based powders, silicon oxide-based materials, silica-based materials, and other standard insulation materials 22. Additionally, the insulation materials 22 may be free-flowing materials that can be poured, blown, compacted, or otherwise disposed within the insulating cavity 18 and insulation cavity 66. This free-flowing material can be in the form of various silica-based materials, such as fumed silica, precipitated silica, nano-sized and/or micro-sized aerogel powder, rice husk ash powder, perlite, glass spheres, hollow glass spheres, cenospheres, diatomaceous earth, combinations thereof, and any other similar insulating particulate or powdered material. The insulation materials 22 substantially fill the insulating cavity 18 forming a substantially continuous layer between the outer wrapper 54 and the inner liner 56. Similarly, the insulation materials 22 substantially fill the insulation cavity 66 forming a substantially continuous layer between the cabinet wrapper 62 and the cabinet liner 64.

In the depicted example of FIGS. 1 and 2, the structural wrapper 16 of the door 14 and the cabinet 58 of the appliance 50 may be made from a material at least partially resistant to bending, deformation, or otherwise being formed in response to an inward compressive force. These materials for the structural wrapper 16 and the cabinet 58 include, but are not limited to, metals, polymers, metal alloys, other similar substantially rigid materials that can be used for vacuum insulated structures 12, or combinations thereof.

Referring still to FIGS. 1 and 2, an at least partial vacuum is defined within the insulating cavity 18 and the insulation cavity 66. The at least partial vacuum defines a pressure differential 82 between an exterior 84 of the appliance 50 and the insulating cavity 18 within the door 14, as well as between the exterior 84 of the appliance 50 and the insulation cavity 66 within the cabinet 58. The pressure differential 82 serves to define the inward compressive force that is exerted on both the outer wrapper 54 and the inner liner 56 and tends to bias the outer wrapper 54 and the inner liner 56 toward the insulating cavity 18. The pressure differential 82 also serves to define the inward compressive force that is exerted on the cabinet wrapper 62 and the cabinet liner 64 and tends to bias each toward the insulation cavity 66.

Figure 3:
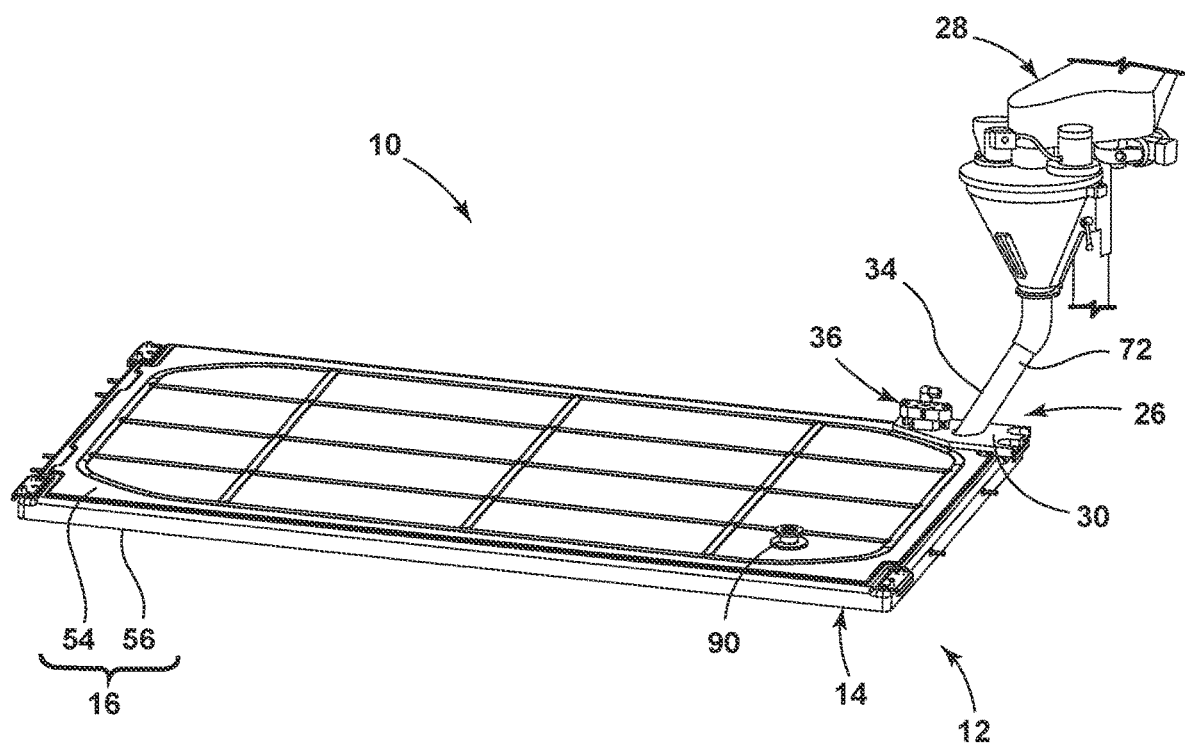
FIG. 3 is a partial side perspective view of a door coupled with a materials dispenser via a connector assembly, according to the present disclosure.
Figure 4:
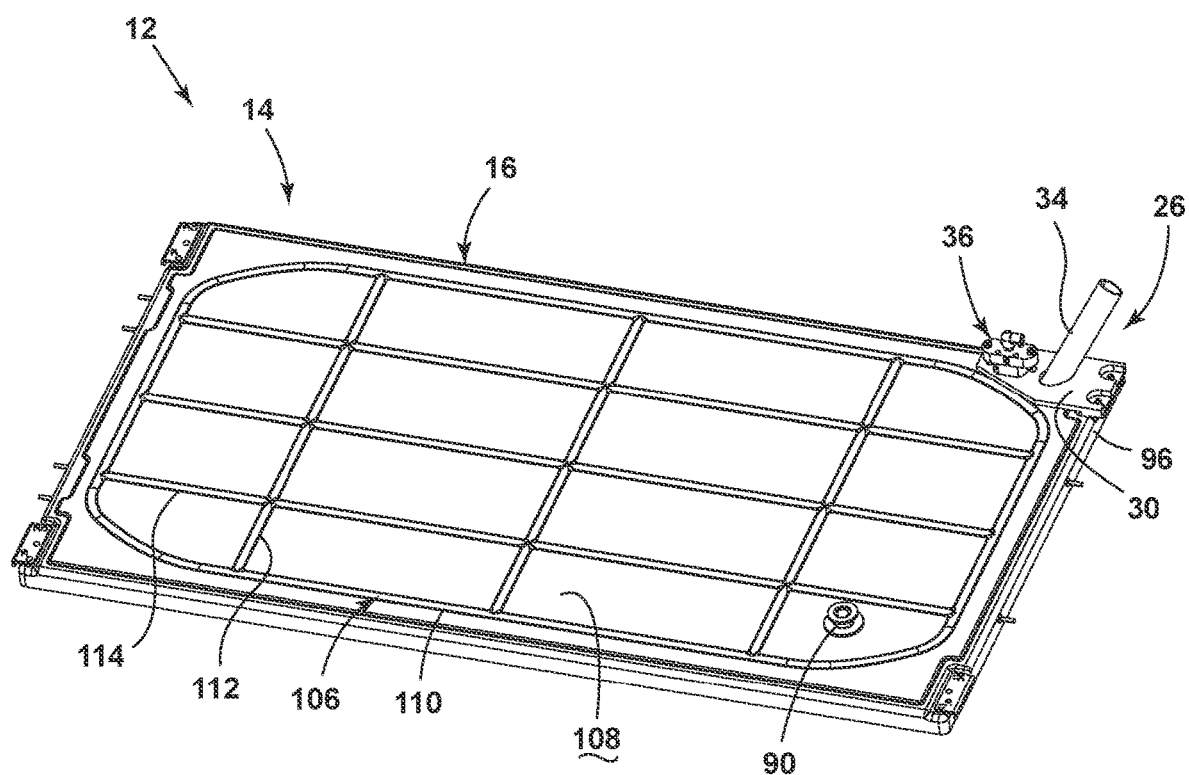
FIG. 4 is a side perspective view of a connector assembly coupled to a door, according to the present disclosure.

With reference now to FIG. 3, the structural wrapper 16 of the door 14 defines an evacuation port 90, which is an opening into the insulating cavity 18. The at least partial vacuum is typically defined by evacuation of fluid from the insulating cavity 18 through the evacuation port 90 with an evacuation port assembly. The evacuation port assembly typically includes a servicing tube. The evacuation port assembly is in fluid communication with the insulating cavity 18 via the evacuation port 90 to expel gas from the insulating cavity 18 to form the vacuum insulation.

The door 14 is illustrated in connection with the materials dispenser 28 via the connector assembly 26. The materials dispenser 28 stores and/or transfers the insulation materials 22 to the insulating cavity 18 of the door 14. Generally, the materials dispenser 28 transfers powdered insulation materials 22, such as silica or fumed silica, to the insulating cavity 18 through the fill port 20. The connector assembly 26 guides the insulation materials 22 from the materials dispenser 28, through the fill port 20, and into the insulating cavity 18. The materials dispenser 28 may be any practicable system, assembly, or unit that stores and/or delivers the insulation materials 22 to various insulated structures and vacuum insulated structures 12.

Though described herein as the door 14, the connector assembly 26 may be utilized with any vacuum insulated structure 12, such as the cabinet 58, the door 14, other panels, etc. Further, the present disclosure is not limited to refrigerators or refrigerated appliances 50. The appliance 50 may be, for example, freezers, coolers, ovens, dishwashers, laundry appliances, water heaters, and other similar appliances 50 and fixtures within household and commercial settings.

Referring now to FIGS. 4-7, the connector assembly 26 is configured to selectively couple to the door 14. The connector assembly 26 may be coupled with the door 14 during a fill process when the insulation materials 22 are to be directed into the insulating cavity 18 and removed from the door 14 when the fill process is paused or complete.

As best illustrated in FIG. 3, the connector assembly 26 is configured to connect the door 14 with the materials dispenser 28. The materials dispenser 28 is configured to engage a distal end 72 of the fill tube 34. The connector assembly 26 provides an interface between the materials dispenser 28 and the door 14 to guide the insulation materials 22 into the insulating cavity 18. The connector assembly 26 may be advantageous for providing a more efficient fill process, as well as for reducing or minimizing spilled insulation materials 22.

In the illustrated configuration, the door 14 defines the fill port 20 in a corner 96 thereof. The fill port 20 is defined by the structural wrapper 16 and provides fluid communication with the insulating cavity 18. The evacuation port 90, which is defined on a same side of the structural wrapper 16, also provides fluid communication with the insulating cavity 18. Though illustrated on the same side of the structural wrapper 16, either the fill port 20 or the evacuation port 90 may be on an opposing side of the structural wrapper 16 or in another practicable location on the door 14.

With reference still to FIG. 4-7, the structural wrapper 16 of the door 14 defines support ribs 106, which generally extend from an outer surface 108 of the structural wrapper 16. The support ribs 106 may be embossed or otherwise defined by the structural wrapper 16. In the illustrated configuration, the support ribs 106 include a border rib 110, which extends generally along the border of the outer surface 108 of the structural wrapper 16. Further, the door 14 includes first cross ribs 112 and second cross ribs 114 forming a grid pattern within the border rib 110. Accordingly, the door 14 does not define the cross ribs 112, 114 outside of the border rib 110. The support ribs 106 may be advantageous for increasing strength and rigidity of the structural wrapper 16.

The border rib 110 generally defines an oblong, generally rounded shape. The rounded shape provides additional space outside the border rib 110 proximate to the corner 96. This additional space is advantageous for the connector assembly 26 to couple to the door 14 without substantial interference from the support ribs 106.

Figure 5:
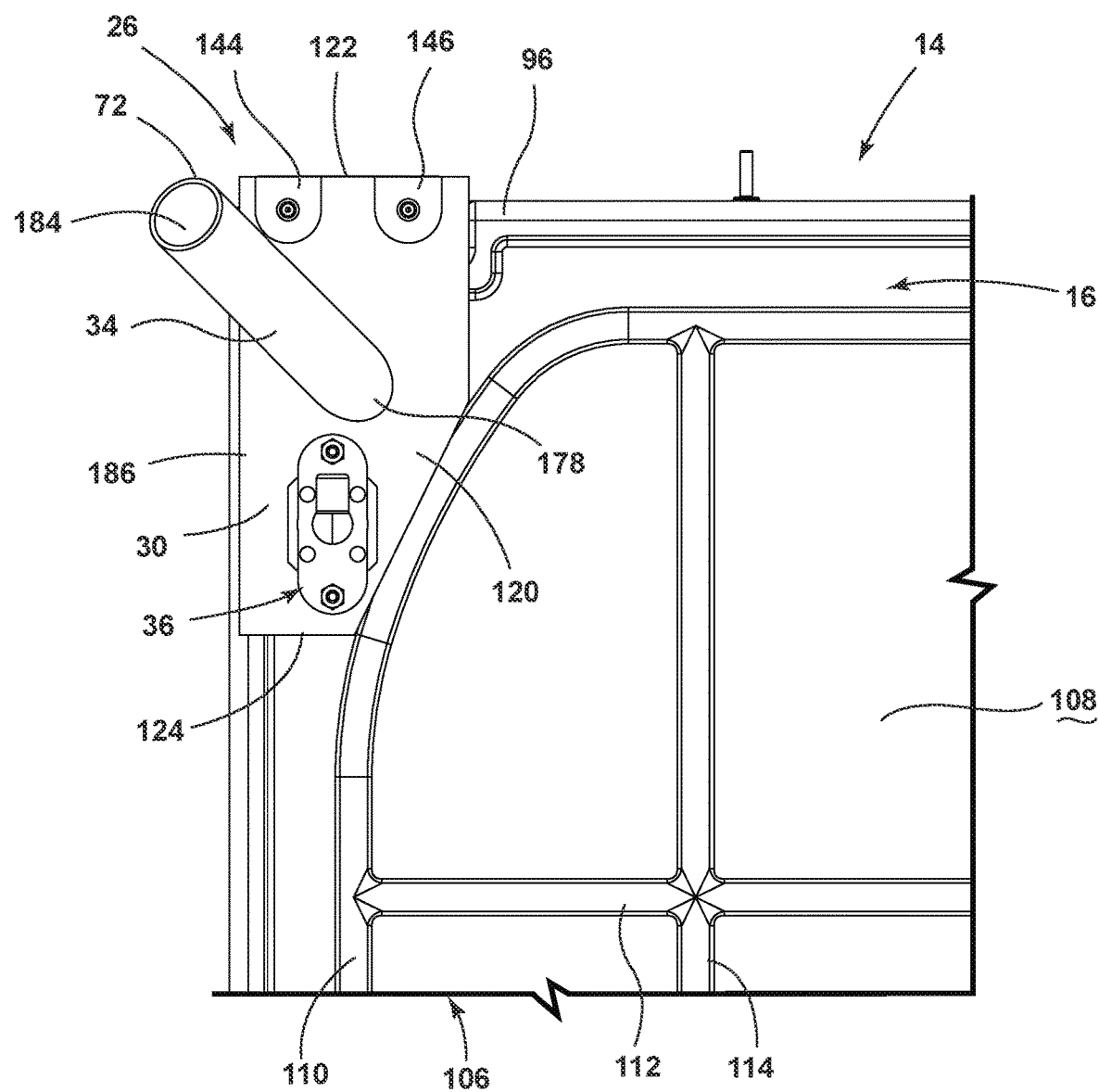
FIG. 5 is a front elevation view of a connector assembly coupled to a door, according to the present disclosure.
Figure 6:
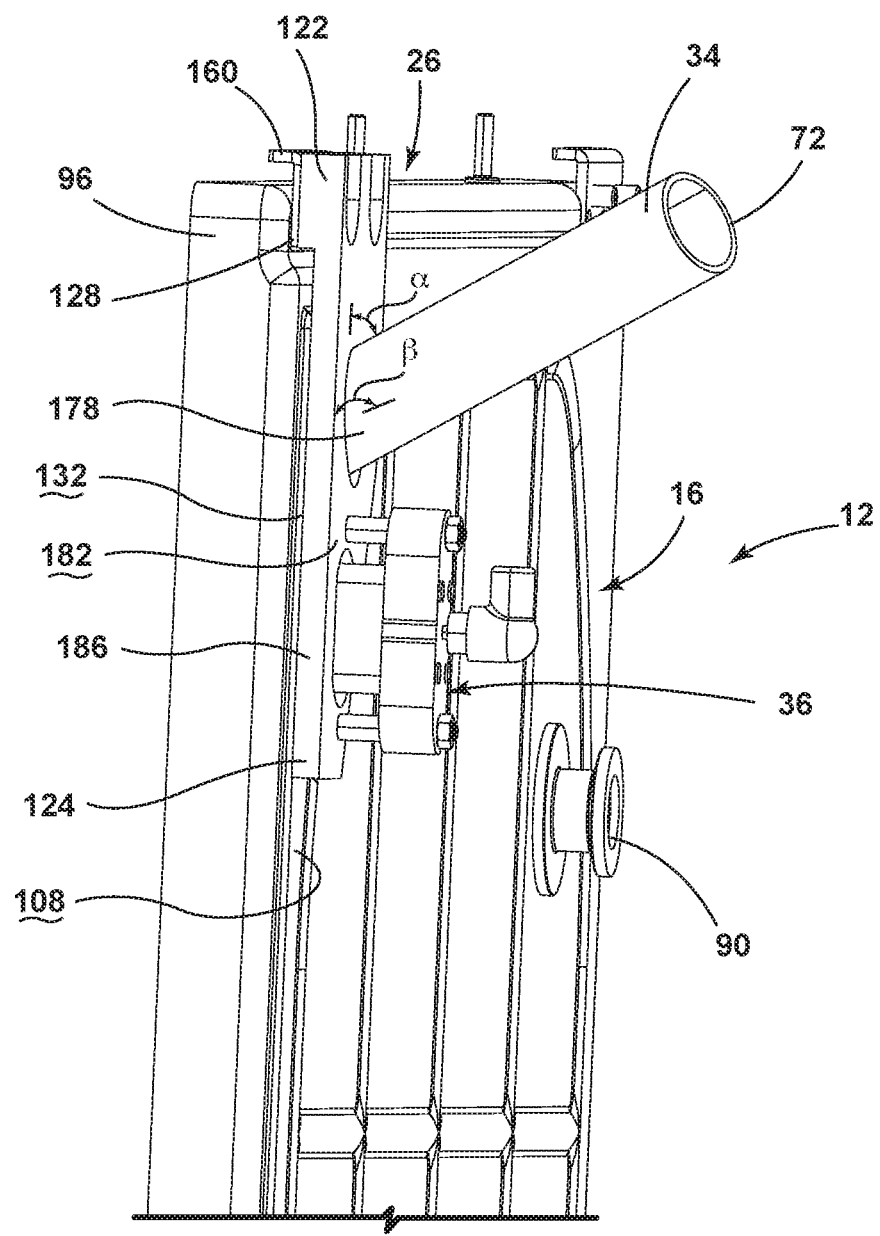
FIG. 6 is a side perspective view of a connector assembly coupled to a door, according to the present disclosure.
Figure 7:
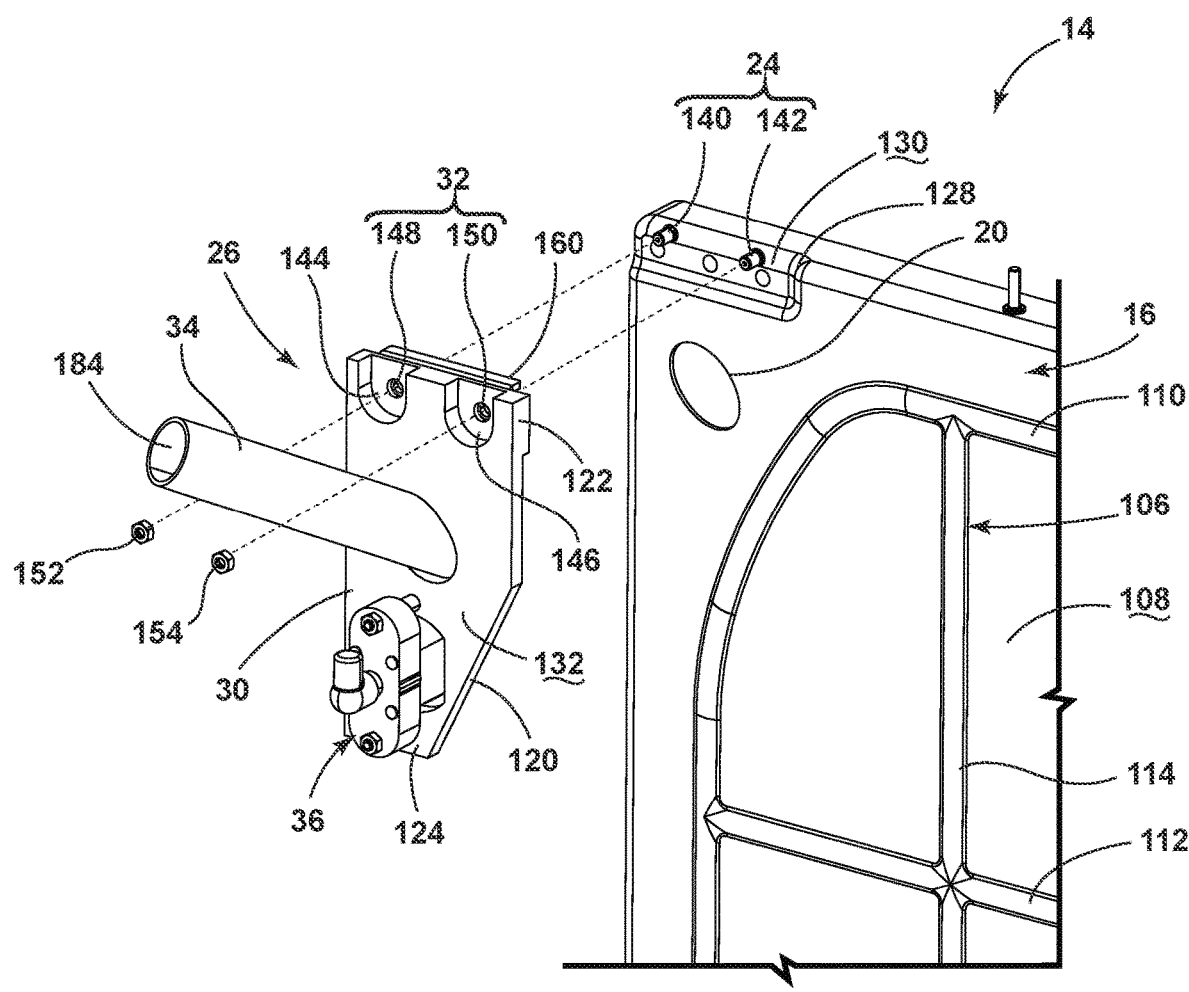
FIG. 7 is a partial side perspective exploded view of a door defining a fill port and a connector assembly, according to the present disclosure.

Referring still to FIGS. 5-7, the connector assembly 26 is configured to selectively couple to the door 14 for the fill process. In this way, the connector assembly 26 is coupled to the door 14 prior to the fill process starting and removed from the door 14 when the fill process is paused or finished. The connector assembly 26 includes the base plate 30. The base plate 30 has a generally rectangular structure with an angled side edge 120. The angled side edge 120 is configured to extend along the border rib 110 when the connector assembly 26 is coupled to the door 14. The base plate 30 having the angled side edge 120 generally allows the base plate 30 to fit within the space outside the border rib 110 on the corner 96 of the door 14. A first edge 122, illustrated as a top edge, of the base plate 30 has a width greater than a width of an opposing second edge 124, illustrated as a bottom edge, which is shortened by the angled side edge 120.

The first edge 122 of the base plate 30 has a thickness greater than the second edge 124. Generally, the corner 96 of the door 14 proximate the fill port 20 defines a recessed region 128 with a recessed surface 130 therein. The recessed surface 130 is set back from the remainder of the outer surface 108 of the structural wrapper 16. The thickened first edge 122 extends into the recessed region 128 to be disposed adjacent to or abutting the recessed surface 130. With the first edge 122 disposed within the recessed region 128, an interior surface 132 of the base plate 30 may be disposed adjacent to or in an abutting relationship with the outer surface 108 of the structural wrapper 16. Further, the base plate 30 extends from the recessed region 128 and over the fill port 20.

As best illustrated in FIG. 7, the door 14 includes two projections 140, 142, which may collectively be referred to as the projections 24, extending from the recessed surface 130. The projections 140, 142 may be disposed entirely within the recessed region 128, or alternatively, extend out of the recessed region 128 and past the outer surface 108 of the structural wrapper 16 that surrounds the recessed region 128. The projections 140, 142 are generally studs coupled with the door 14. In such configurations, the studs are coupled to the structural wrapper 16 and extend therefrom.

The base plate 30 of the connector assembly 26 defines two recessed regions 144, 146 along with the first edge 122 thereof. The first edge 122 may have an increased thickness compared to the second edge 124 to define the recessed regions 144, 146. Receiving apertures 148, 150, which may be collectively referred to as the apertures 32, are defined in the thickened first edge 122. For example, one receiving aperture 148 is defined within the recessed region 144, and the other receiving aperture 150 is defined within recessed region 146.

The projections 140, 142 are generally horizontally aligned with one another. When the connector assembly 26 is coupled to the door 14, the projections 140, 142 are configured to extend through the respective receiving aperture 148, 150. The engagement between the base plate 30 and the projections 140, 142 may assist in aligning the connector assembly 26 with the door 14. Additionally, nuts 152, 154, or similar features, may be coupled to the projections 140, 142 within the recessed regions 144, 146 to couple and retain the connector assembly 26 to the door 14 during the fill process. The nuts 152, 154 are disposed on an opposing side of the base plate 30 relative to the recessed surface 130. It is contemplated that the door 14 may not include the projections 140, 142. In such examples, the receiving apertures 148, 150 may remain open when the connector assembly 26 is coupled to the door 14. Alternatively, various configurations of the connector assembly 26 may not define the receiving apertures 148, 150.

Figure 8:
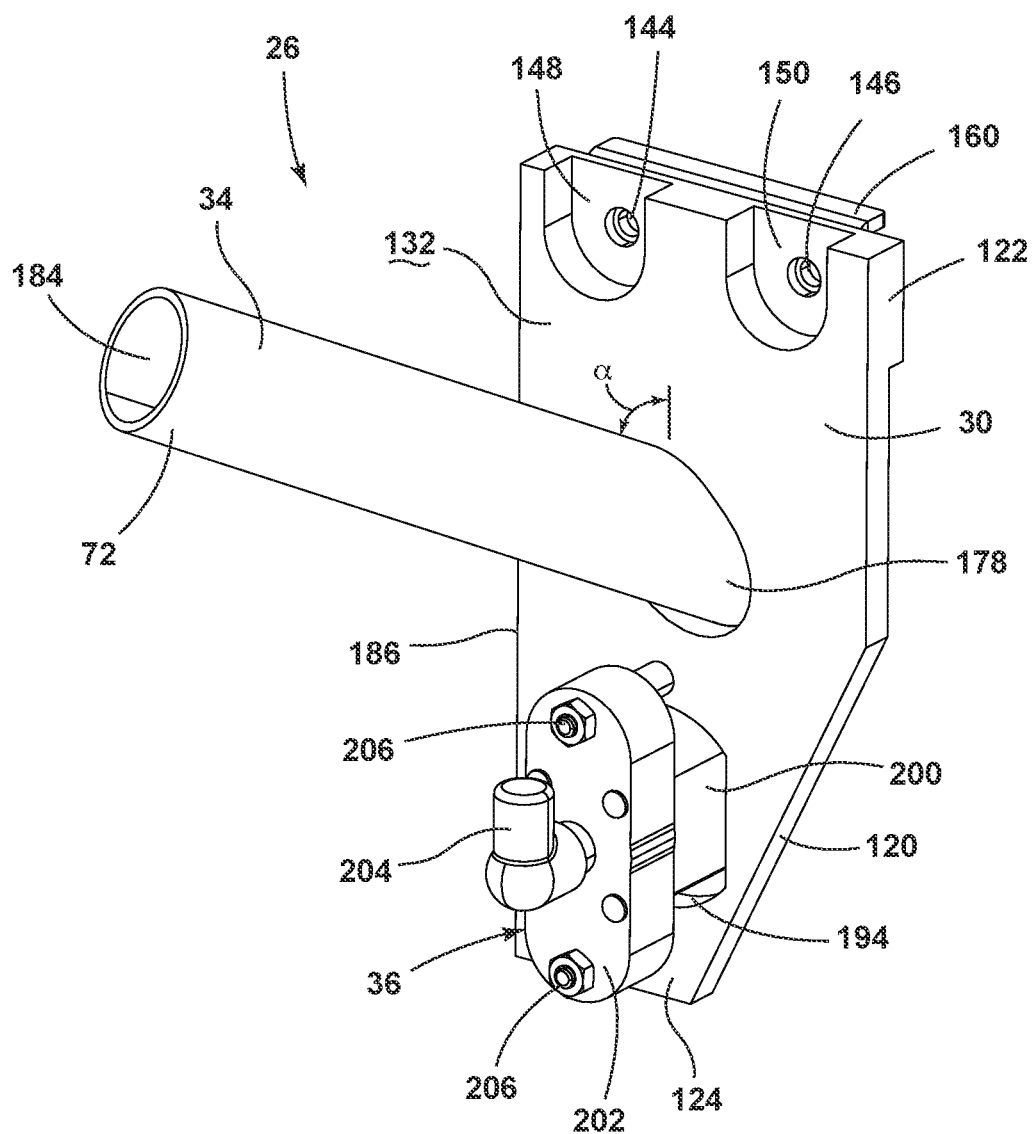
FIG. 8 is a front perspective view of a connector assembly, according to the present disclosure.
Figure 9:
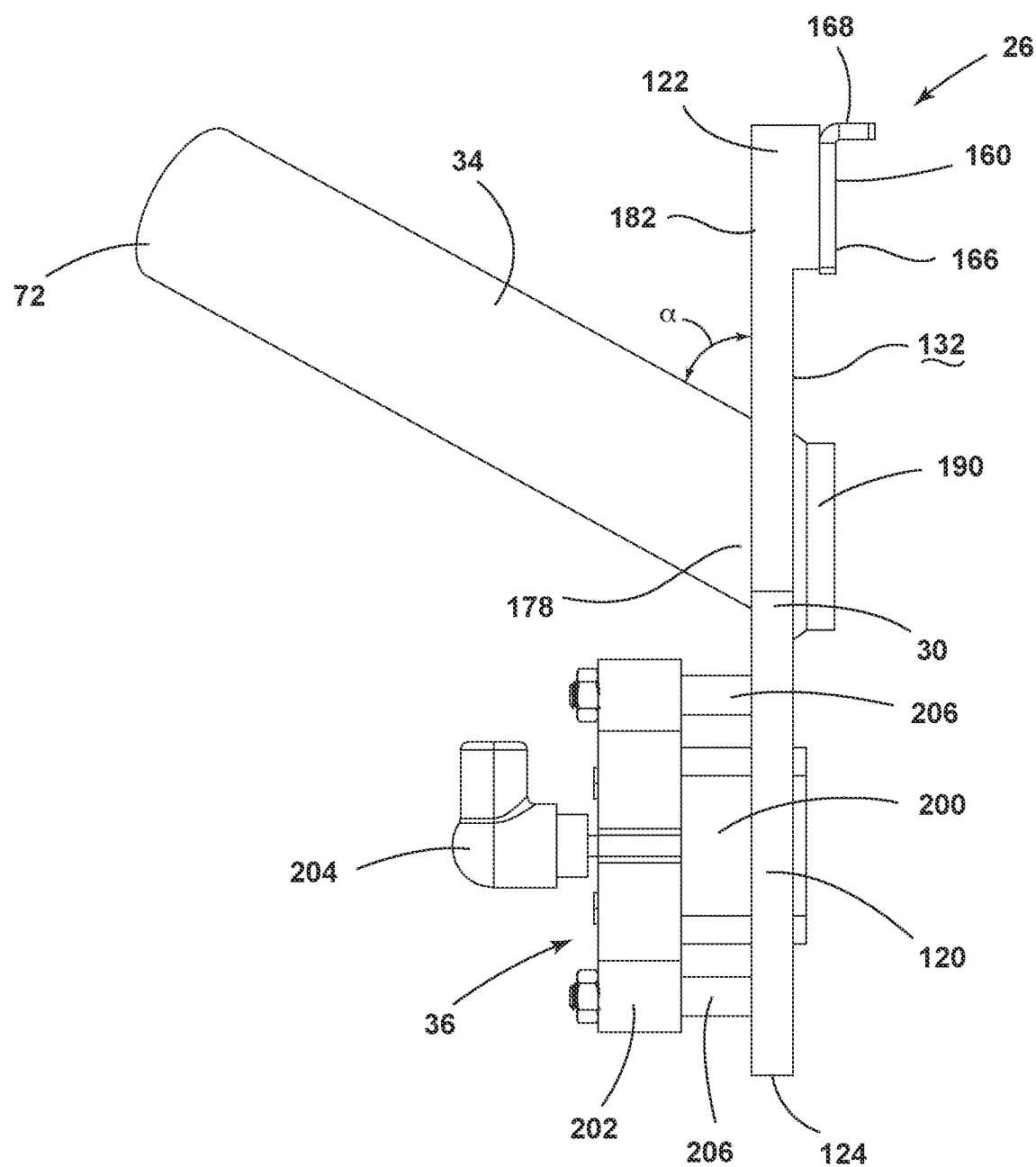
FIG. 9 is a side elevation view of a connector assembly, according to the present disclosure.
Figure 10:
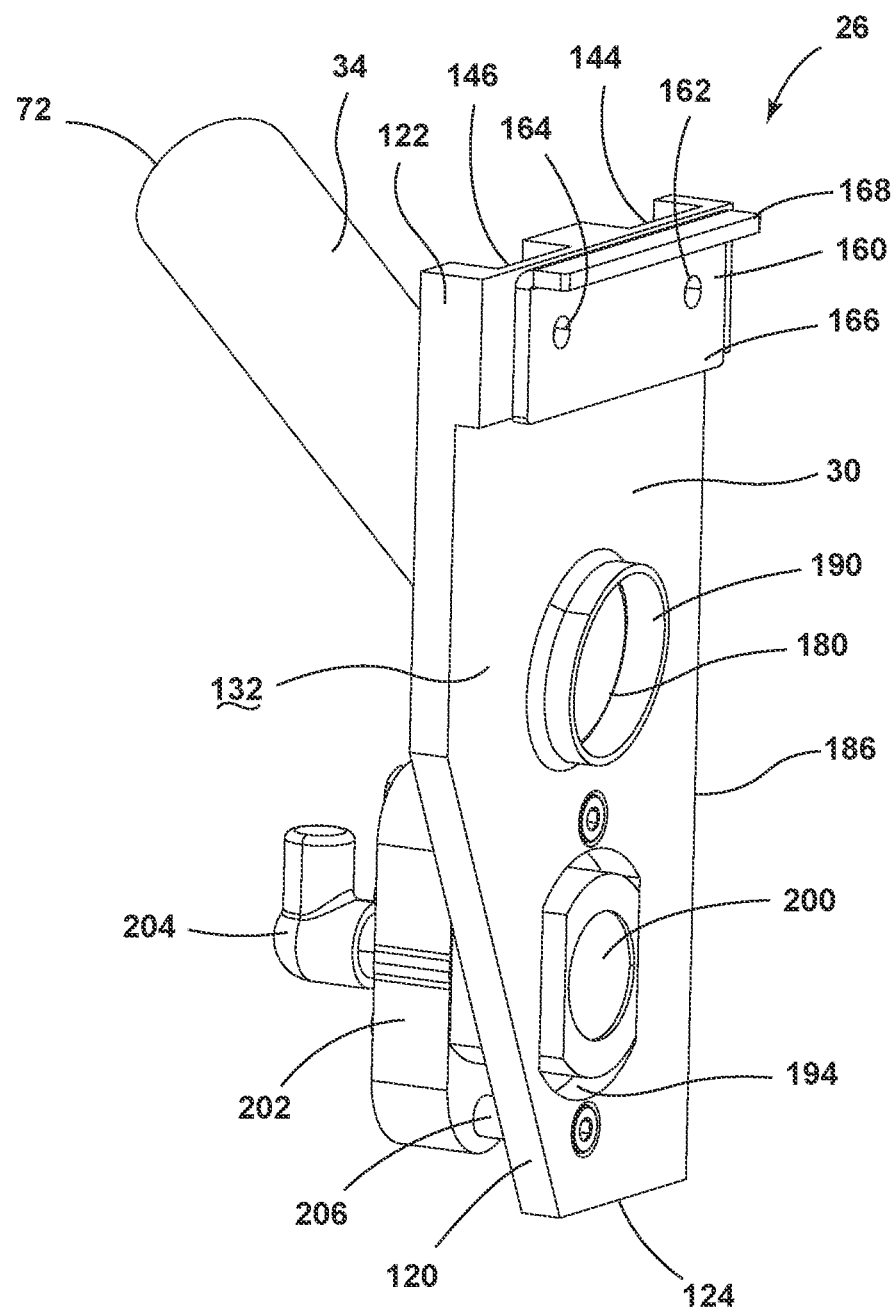
FIG. 10 is a rear perspective view of a connector assembly, according to the present disclosure.

Referring to FIGS. 8-10, the connector assembly 26 includes a bracket 160. The bracket 160 is coupled to the interior surface 132 of the base plate 30 along the first edge 122. The bracket 160 defines corresponding apertures 162, 164, which align with the apertures 148, 150 defined by the base plate 30. In this way, the projections 140, 140 (FIG. 7) extend through the bracket 160 and the base plate 30 when engaging the connector assembly 26.

The bracket 160 is generally L-shaped. The bracket 160 includes a coupling portion 166 that extends along the interior surface 132 of the first edge 122 and an extension portion 168 that extends generally perpendicular to the coupling portion 166. The bracket 160 may be advantageous for aligning the connector assembly 26 with the door 14, for providing additional strength to the engagement between the projections 140, 142 and the base plate 30, or a combination thereof.

The connector assembly 26 includes the fill tube 34 coupled to the base plate 30. Generally, each of the base plate 30 and the fill tube 34 are constructed of metal materials, such as steel. In such examples, a proximal end 178 of the fill tube 34 is welded or otherwise attached to the base plate 30.

With reference still to FIGS. 8-10, the base plate 30 defines a fill opening 180, and the fill tube 34 is aligned with the fill opening 180. The proximal end 178 of the fill tube 34 extends around the fill opening 180. The fill tube 34 is coupled to an outer surface 182 of the base plate 30 and extends away from the door 14 when the connector assembly 26 is coupled to the door 14 (FIG. 1). The fill tube 34 defines an inner channel 184, which is in fluid communication with the fill opening 180 of the base plate 30, thereby forming a path for the insulation materials 22 (FIG. 2) through the fill tube 34, through the base plate 30, and into the insulating cavity 18 (FIG. 1).

In the illustrated configuration, the fill tube 34 extends at an acute angle α relative to the outer surface 182 of the base plate 30. Instead of extending perpendicularly relative to the outer surface 182, the fill tube 34 extends toward the first edge 122 of the base plate 30 (e.g., away from the toggle magnet 36). Additionally, the fill tube 34 may extend at a side angle β relative to a central axis of the base plate 30. The fill tube 34 extends at the side angle β toward a side edge 186 of the base plate 30, which is an opposite side relative to the angled side edge 120. The side angle β is generally an acute angle defined between the fill tube 34 and the outer surface 182 of the base plate 30. The angles α, β of the fill tube 34 may be advantageous for connecting the fill tube 34 to the materials dispenser 28 (FIG. 3).

The connector assembly 26 includes a locating feature 190 coupled to and extending from the interior surface 132 of the base plate 30. In the illustrated configuration, the locating feature 190 is configured as a radial flange, which extends around the fill opening 180. The locating feature 190 is generally aligned with the proximal end 178 of the fill tube 34. The locating feature 190 may form a continuation of the fill tube 34 and the inner channel 184 defined by the fill tube 34. The locating feature 190 may be advantageous for aligning the connector assembly 26 with the fill port 20 (FIG. 7), as well as guiding the fill materials 22 into the insulating cavity 18 (FIG. 2). The locating feature 190 may provide a more efficient interface between the connector assembly 26 and the door 14 by removing openings along a fill path between the connector assembly 26 and the door 14 that may cause the insulation materials 22 to spill (FIG. 1).

Referring still to FIGS. 8-10, the connector assembly 26 also includes the toggle magnet 36 coupled to the base plate 30. The toggle magnet 36 may also be referred to as an on/off magnet. The toggle magnet 36 extends into or through an aperture 194 defined in the base plate 30. Generally, the aperture 194 is defined proximate to the second edge 124 of the base plate 30. The toggle magnet 36 may be spaced from the door 14 when deactivated and drawn closer to the door 14 when activated due to the magnetic engagement therebetween. In such examples, the toggle magnet 36 may be flush or coplanar with the interior surface 132 of the base plate 30. Alternatively, the toggle magnet 36 may extend beyond the interior surface 132 (e.g., through the aperture 194 of the base plate 30) to abut the door 14. The toggle magnet 36 may be adjustable to adjust the position of the toggle magnet 36 relative to the base plate 30 and, consequently, relative to the door 14.

The toggle magnet 36 includes a magnet assembly 200, a mounting flange 202, and a switch 204. The magnet assembly 200 generally includes one or more magnets within a steel case. The steel case concentrates and focuses a magnetic field generated by the one or more magnets of the magnet assembly 200.

The magnet assembly 200 is coupled with the mounting flange 202. The mounting flange 202 is utilized for coupling the toggle magnet 36 with the base plate 30. Coupling members 206 generally extend through the mounting flange 202 and engage the base plate 30, thereby coupling the toggle magnet 36 to the base plate 30. Generally, the toggle magnet 36 includes two coupling members 206 with one coupling member 206 disposed on each side of the magnet assembly 200 and the aperture 194 of the base plate 30. The coupling members 206 may be screws, bolts, rivets, or other features for coupling the toggle magnet 36 to the base plate 30.

The toggle magnet 36 also includes the switch 204, which is configured to adjust the toggle magnet 36 between the activated state and the deactivated state. When in the activated state, the magnetic field of the magnet assembly 200 is focused outwardly, which causes the toggle magnet 36 to magnetically engage the structural wrapper 16 of the door 14. When in the deactivated state, the magnetic field is redirected internally within the magnet assembly 200, such that the toggle magnet 36 does not magnetically engage the structural wrapper 16 or any other material. The switch 204 is generally configured to rotate approximately 180°, which may cause changes in the magnet assembly 200 to adjust how the magnetic field is concentrated and directed. When the switch 204 is in a first position, the toggle magnet 36 may be activated, and when the switch 204 is in a second position the toggle magnet 36 may be deactivated.

Referring still to FIGS. 8-10, the activation of the toggle magnet 36 may be advantageous for coupling the connector assembly 26 to the door 14. In certain aspects, the toggle magnet 36 may couple the connector assembly 26 to the door 14 in combination with the engagement between the projections 140, 142 and the base plate 30. Alternatively, the toggle magnet 36 may couple the connector assembly 26 to the door 14 without the engagement between the projections 140, 142 and the base plate 30. Additionally, once the toggle magnet 36 is deactivated, the absence of the magnetic engagement with the door 14 allows for more convenient disengagement of the connector assembly 26 from the door 14.

In various examples, the connector assembly 26 may include a permanent magnet in lieu of or in combination with the toggle magnet 36. The permanent magnet may not be switched between the activated and deactivated states, but may consistently generate the magnetic field. In such examples, the permanent magnet may generate a sufficient magnetic force to engage the door 14 and be disengaged from the door 14 by a user.

Figure 11:
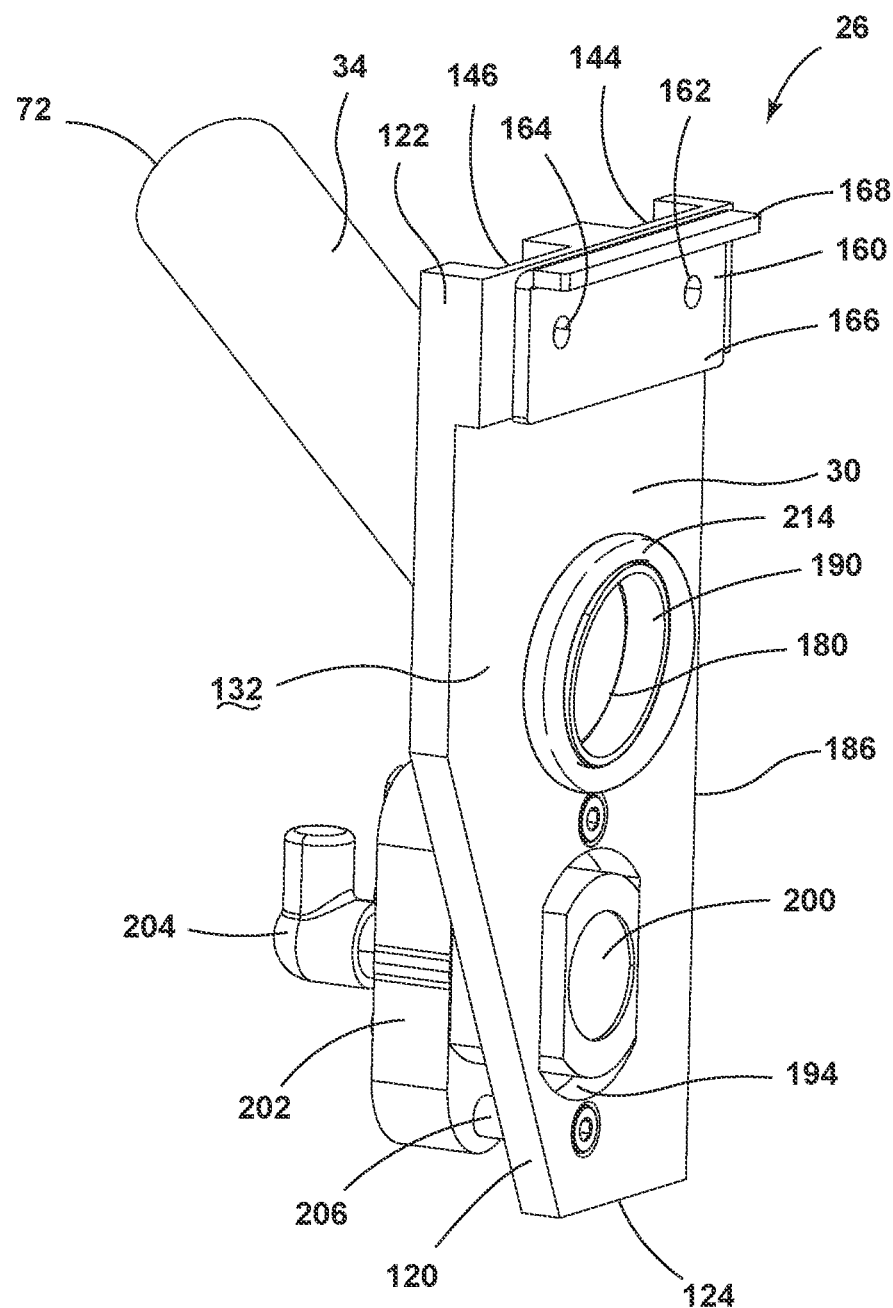
FIG. 11 is a rear perspective view of a connector assembly with a gasket, according to the present disclosure.

With reference now to FIG. 11, the connector assembly 26 may include a gasket 214 coupled to the interior surface 132 of the base plate 30. The gasket 214 generally extends around the fill opening 180 and the locating feature 190. The gaskets 214 may be coupled to the locating feature 190, or alternatively may be spaced from the locating feature 190. The gaskets 214 may be constructed of an elastically deformable material, such as rubber or foam. The gasket 214 is configured to compress or deform when pressed against the structural wrapper 16. In examples with the gasket 214, the gasket 214 may abut the outer surface 108 of the structural wrapper 16. The gasket 214 may space the interior surface 132 of the base plate 30 from the outer surface 108 of the structural wrapper 16. It is contemplated that the gasket 214 may sufficiently compress such that the interior surface 132 abuts the outer surface 108 of the structural wrapper 16. The gasket 214 may be advantageous for providing a seal around the fill opening 180 and the fill port 20 of the door 14. This seal may prevent or minimize the insulation materials 22 from spilling between the connector assembly 26 and the door 14. It is also contemplated that the activation of the toggle magnet 36 is configured to draw the connector assembly 26 closer to the door 14, thereby compressing the gasket 214.

Figure 12:
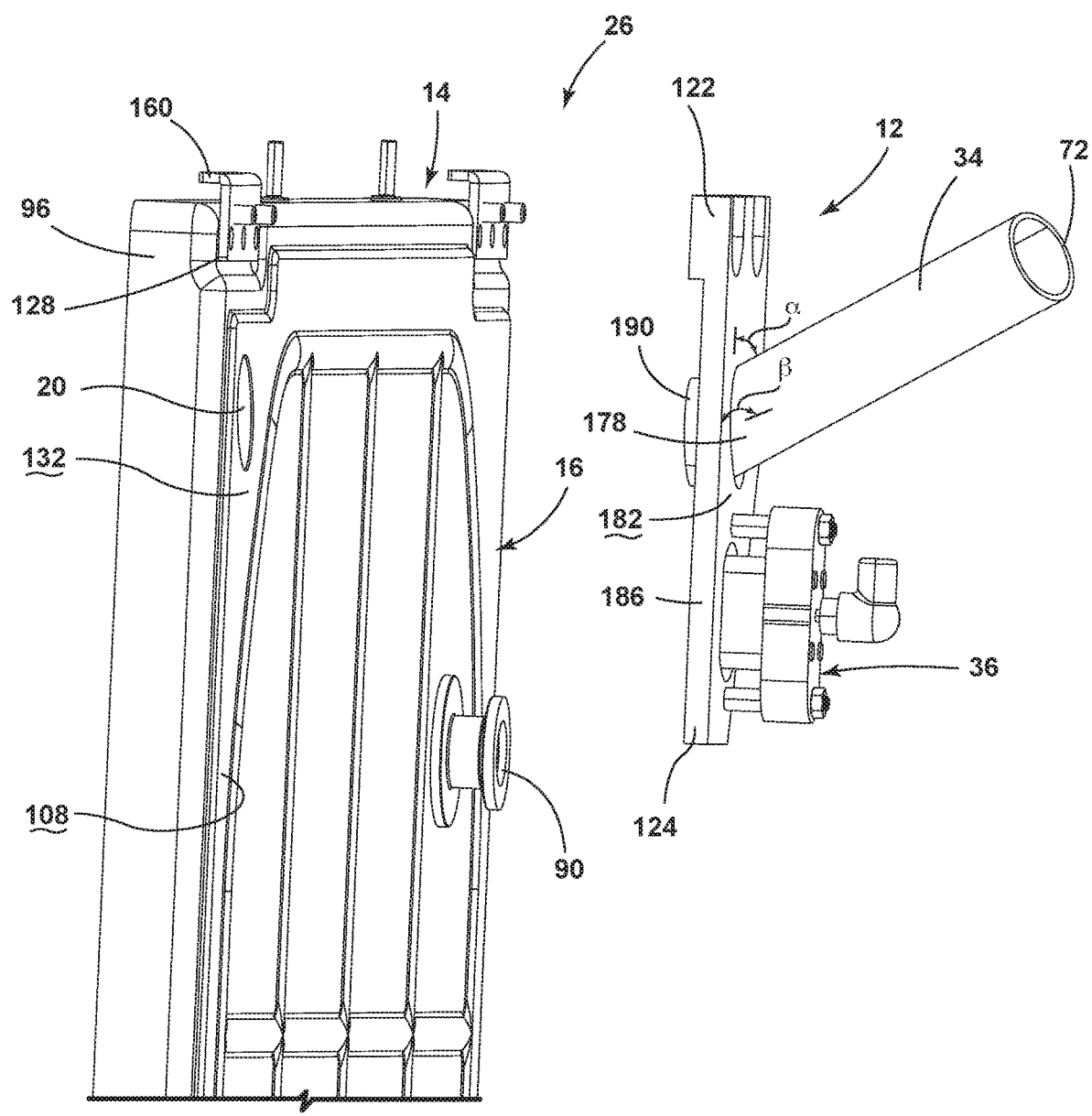
FIG. 12 is a partial side perspective exploded view of a door defining a fill port and a connector assembly, according to the present disclosure.
Figure 13:
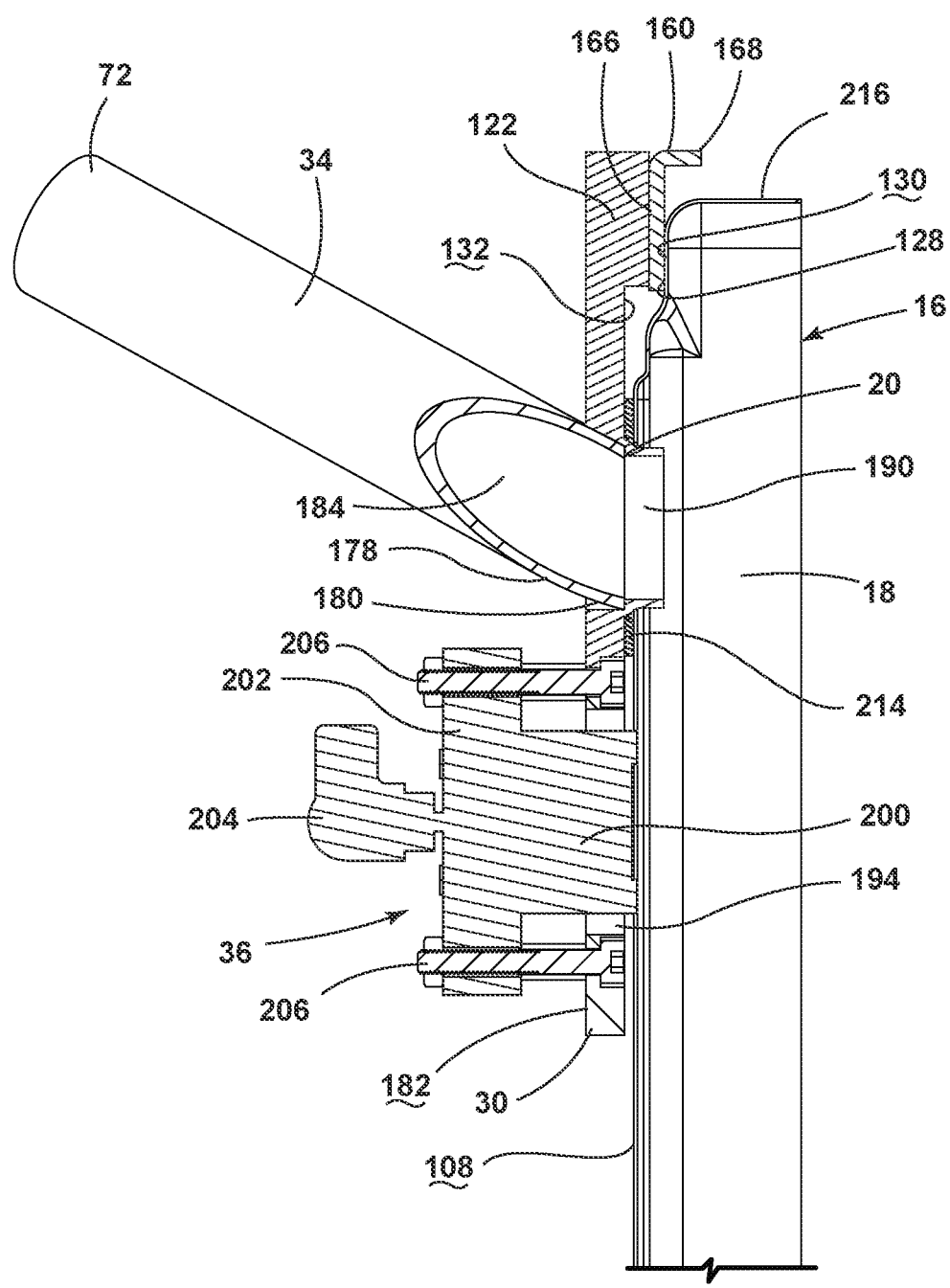
FIG. 13 is a cross-sectional side elevation view of a connector assembly coupled to a door, according to the present disclosure.

Referring to FIGS. 12 and 13, the connector assembly 26 is coupled to the corner 96 of the door 14. The locating feature 190 is utilized to align the fill tube 34 with the fill port 20. The locating feature 190 generally extends through the fill port 20 and into the insulating cavity 18. When the locating feature 190 is configured as the radial flange, the locating feature 190 extends entirely around the fill port 20 and abut the structural wrapper 16. In such configurations, the abutting engagement between the locating feature 190 and the structural wrapper 16 defining the fill port 20 limits or prevents movement of the connector assembly 26 relative to the door 14.

Additionally, the first edge 122 and the bracket 160 are disposed within the recessed region 128 with the bracket 160 adjacent to or abutting the recessed surface 130. The engagement between the bracket 160 and the recessed surface 130 may also assist in aligning or stabilizing the connector assembly 26. The extension portion 168 of the bracket 160 generally extends over an edge surface 216 of the structural wrapper 16. As best illustrated in FIG. 13, the extension portion 168 is generally spaced from the edge surface 216. However, it is contemplated that the extension portion 168 may abut the edge surface 216, which may assist in aligning and stabilizing the connector assembly 26.

When the connector assembly 26 is coupled to the door 14, the interior surface 132 of the base plate 30 is disposed adjacent to or in an abutting engagement with the outer surface 108 of the structural wrapper 16. The gasket 214 may be disposed within the space between the base plate 30 and the door 14. The gasket 214 may abut and be compressed against the outer surface 108 of the structural wrapper 16.

Referring to FIGS. 1-13, the connector assembly 26 is selectively coupled to the door 14 to assist the fill process for inserting the insulation materials 22 into the insulating cavity 18 from the materials dispenser 28. The connector assembly 26 is positioned adjacent to the corner 96 of the door 14. The locating feature 190 is inserted into the fill port 20. The projections 140, 142 extend through the apertures 148, 150 defined in the base plate 30. The nuts 152, 154 are coupled to the projections 140, 142 within the recessed regions 144, 146. In this configuration, the fill tube 34 extends away from the outer surface 108 of the structural wrapper 16. The fill tube 34 extends toward the first edge 122 of the base plate 30 and the edge surface 216 of the structural wrapper 16. In this way, the acute angle α is defined between the fill tube 34 and the outer surface 182 of the base plate 30. Further, the fill tube 34 also extends at the side angle β relative to the outer surface 182 of the base plate 30. In this way, the fill tube 34 extends away from the border rib 110 defined by the structural wrapper 16.

The toggle magnet 36 abuts the structural wrapper 16. The user adjusts the switch 204 to adjust the toggle magnet 36 to the activated state. When in the activated state, the toggle magnet 36 magnetically engages the structural wrapper 16. The engagement between the projections 140, 142 and the nuts 152, 154 and the engagement between the toggle magnet 36 and the structural wrapper 16 retains the connector assembly 26 in position against the door 14. Further, with the activation of the toggle magnet 36, the gasket 214 may be compressed to provide the seal around the fill port 20 of the door 14 and the fill opening 180 of the connector assembly 26.

The connector assembly 26 may then be connected with the materials dispenser 28 for the fill process, where the insulation materials 22 are inserted along the fill path defined by the connector assembly 26 to be inserted into the insulating cavity 18. Upon completion of the fill process, the connector assembly 26 is disengaged from the materials dispenser 28. The nuts 152, 154 may be disengaged from the projections 140, 142. The user may also adjust the switch 204 to adjust the toggle magnet 36 to the deactivated state. The connector assembly 26 may then be disengaged from the door 14.

As generally illustrated and described herein, the connector assembly 26 is utilized for inserting the insulation materials 22 into the door 14. The connector assembly 26 may be used with any configuration of the vacuum insulated structure 12 that has insulation materials 22 deposited therein. For example, the vacuum insulated structure 12 may be the door 14, the cabinet 58, or other panels and structures. In examples where the connector assembly 26 is utilized with the cabinet 58, at least one of the cabinet wrapper 62 and the cabinet liner 64 defines the fill port 20 for depositing the insulation materials 22 within the insulation cavity 66. The connector assembly 26 may be selectively coupled to any practicable configuration of the vacuum insulated structure 12 to provide an interface between the vacuum insulated structure 12 and the materials dispenser 28.

Use of the present device may provide for a variety of advantages. For example, the connector assembly 26 may be coupled to the vacuum insulated structure 12, such as the door 14, for the fill process and may be removed from the vacuum insulated structure 12 when the fill process is complete. In this way, a final product of the vacuum insulated structure 12 may not include the connector assembly 26. Further, the connector assembly 26 may guide the insulation materials 22 into the insulating cavity 18 or the insulation cavity 66. Additionally, the connector assembly 26 provides an interface between the materials dispenser 28 and vacuum insulated structure 12. Also, the connector assembly 26 may be coupled to the vacuum insulated structure 12 via the toggle magnet 36, the projections 140, 142, or a combination thereof. Moreover, the gasket 214 may provide a seal that extends around the fill port 20. Additionally, the locating feature 190 may extend through the fill port 20, which assists with aligning the connector assembly 26 with the vacuum insulated structure 12, as well as guiding the insulation materials 22 during the fill process. Additional benefits or advantages may be realized and/or achieved.

The device disclosed herein is further summarized in the following paragraphs and is further characterized by combinations of any and all of the various aspects described therein.

According to another aspect of the present disclosure, a fill system for a vacuum insulated structure includes a door having a structural wrapper that defines an insulating cavity. The structural wrapper defines a fill port that is in fluid communication with the insulating cavity for receiving insulation materials therein. The door defines at least one projection extending from proximate to the fill port. A connector assembly is selectively coupled to the door for coupling the door with a materials dispenser. The connector assembly includes a base plate configured to be disposed adjacent to the structural wrapper. The base plate defines at least one aperture configured to receive the at least one projection. A fill tube extends from the base plate and is configured to align with the fill port. A toggle magnet is coupled to the base plate. The toggle magnet is operable between an activated state and a deactivated state. The toggle magnet is configured to magnetically engage the door when in the activated state.

According to another aspect, a connector assembly includes a locating feature that extends from an interior surface of the base plate. The locating feature is configured to extend through a fill port.

According to another aspect, a locating feature aligns with a fill tube to form an extension of the fill tube.

According to another aspect, a fill tube extends away from a toggle magnet at an acute angle relative to an outer surface of a base plate.

According to another aspect, a door defines an evacuation port for drawing fluid from the insulating cavity of the door to provide a vacuum insulation.

According to another aspect, a door defines a recessed region and at least one projection extends from the recessed region.

According to another aspect, a base plate has a first edge having a greater thickness compared to a second opposing edge of the base plate. The first edge extends into a recessed region.

According to another aspect, at least one projection includes two horizontally aligned projections and at least one aperture defines two apertures that are each configured to receive one of the two horizontally aligned projections.

According to another aspect, an appliance door includes a structural wrapper that defines an insulating cavity. The structural wrapper defines a fill port for receiving insulation material and the fill port is in fluid communication with the insulating cavity. A connector assembly is configured to selectively couple the structural wrapper with a materials dispenser. The connector assembly includes a base plate configured to be disposed adjacent to an outer surface of the structural wrapper. A toggle magnet is coupled to the base plate. The toggle magnet is configured to selectively couple the connector assembly to the structural wrapper when activated. A fill tube extends from the base plate and is configured to extend away from the structural wrapper when the connector assembly is coupled to the structural wrapper. The fill tube is configured to engage the materials dispenser.

According to another aspect, a base plate defines an aperture and a toggle magnet extends into the aperture to engage a structural wrapper.

According to another aspect, a base plate defines a receiving aperture configured to receive a stud extending from a structural wrapper.

According to another aspect, a connector assembly includes a radial flange extending from an interior surface thereof that aligns with a proximal end of a fill tube.

According to another aspect, a radial flange is configured to extend through a fill port when a connector assembly is coupled to a structural wrapper.

According to another aspect, a base plate defines a fill opening aligned with a fill tube. A connector assembly includes a gasket coupled to an interior surface of the base plate that extends around the fill opening and is configured to engage a structural wrapper.

According to another aspect, a toggle magnet includes a switch to adjust the toggle magnet between an activated state and a deactivated state. The toggle magnet is configured to magnetically engage a structural wrapper when in the activated state.

According to yet another aspect, a connector assembly includes a base plate that defines a fill opening and an aperture. A fill tube is coupled to a first side of the base plate. The fill tube is aligned with the fill opening. A radial flange is coupled to a second side of the base plate. The radial flange extends around the fill opening. A toggle magnet is coupled to the first side of the base plate proximate to the aperture. The toggle magnet is operable between an activated state and a deactivated state.

According to another aspect, a gasket is coupled to a second side of a base plate and configured to extend around a fill opening.

According to another aspect, a base plate defines a recessed region. A receiving aperture is defined within the recessed region.

According to another aspect, an L-shaped bracket is coupled to a second side of a base plate along a first edge thereof. The first edge has an increased thickness compared to a second opposing edge of the base plate.

According to another aspect, a fill tube extends at an acute angle from a base plate.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A fill system for a vacuum insulated structure, comprising:
   a door having a structural wrapper defining an insulating cavity, wherein the structural wrapper defines a fill port in fluid communication with the insulating cavity for receiving insulation materials therein, and wherein the door defines at least one projection extending from proximate to the fill port; and
   a connector assembly selectively coupled to the door for coupling the door with a materials dispenser, wherein the connector assembly includes:
      a base plate configured to be disposed adjacent to the structural wrapper, wherein the base plate defines at least one aperture configured to receive the at least one projection;
      a fill tube that extends from the base plate and is configured to align with the fill port; and
      a toggle magnet coupled to the base plate, wherein the toggle magnet is operable between an activated state and a deactivated state, and wherein the toggle magnet is configured to magnetically engage the door when in the activated state.

2. The fill system of claim 1, wherein the connector assembly includes a locating feature that extends from an interior surface of the base plate, wherein the locating feature is configured to extend through the fill port.

3. The fill system of claim 2, wherein the locating feature aligns with the fill tube to form an extension of the fill tube.

4. The fill system of claim 1, wherein the fill tube extends away from the toggle magnet at an acute angle relative to an outer surface of the base plate.

5. The fill system of claim 1, wherein the door defines an evacuation port for drawing fluid from the insulating cavity of the door to provide a vacuum insulation.

6. The fill system of claim 1, wherein the door defines a recessed region and the at least one projection extends from the recessed region.

7. The fill system of claim 6, wherein the base plate has a first edge having a greater thickness compared to a second opposing edge of the base plate, wherein the first edge extends into the recessed region.

8. The fill system of claim 6, wherein the at least one projection includes two horizontally aligned projections and the at least one aperture defines two apertures that are each configured to receive one of the two horizontally aligned projections.

9. An appliance door, comprising:
   a structural wrapper defining an insulating cavity, wherein the structural wrapper defines a fill port for receiving insulation material and the fill port is in fluid communication with the insulating cavity; and
   a connector assembly configured to selectively couple the structural wrapper with a materials dispenser, wherein the connector assembly includes:
      a base plate configured to be disposed adjacent to an outer surface of the structural wrapper;
      a toggle magnet coupled to the base plate, wherein the toggle magnet is configured to selectively couple the connector assembly to the structural wrapper when activated; and
      a fill tube extending from the base plate and configured to extend away from the structural wrapper when the connector assembly is coupled to the structural wrapper, wherein the fill tube is configured to engage the materials dispenser.

10. The appliance door of claim 9, wherein the base plate defines an aperture and the toggle magnet extends into the aperture to engage the structural wrapper.

11. The appliance door of claim 9, wherein the base plate defines a receiving aperture configured to receive a stud extending from the structural wrapper.

12. The appliance door of claim 9, wherein the connector assembly includes a radial flange extending from an interior surface thereof that aligns with a proximal end of the fill tube.

13. The appliance door of claim 12, wherein the radial flange is configured to extend through the fill port when the connector assembly is coupled to the structural wrapper.

14. The appliance door of claim 9, wherein the base plate defines a fill opening aligned with the fill tube, wherein the connector assembly includes a gasket coupled to an interior surface of the base plate that extends around the fill opening and is configured to engage the structural wrapper.

15. The appliance door of claim 9, wherein the toggle magnet includes a switch to adjust the toggle magnet between an activated state and a deactivated state, and wherein the toggle magnet is configured to magnetically engage the structural wrapper when in the activated state.

* * * * *